United States Patent [19]
Link et al.

[11] 3,948,122
[45] Apr. 6, 1976

[54] AUTOMATIC PROGRAMMED PROFILE LATHES

[75] Inventors: Helmut Link, Schanbach; Guenther Gumhold, Plochingen, both of Germany

[73] Assignee: Index-Werke KG Hahn & Tessky, Esslingen, Germany

[22] Filed: July 22, 1974

[21] Appl. No.: 490,731

[52] U.S. Cl. ............................................. 82/14 C
[51] Int. Cl.² .......................................... B23B 3/28
[58] Field of Search ...... 82/14 R, 14 A, 14 B, 14 C, 82/14 D, 14 E

[56] References Cited
UNITED STATES PATENTS

| | | | |
|---|---|---|---|
| 2,601,345 | 6/1952 | Turchan | 82/14 E |
| 2,695,543 | 11/1954 | Von Zelewsky | 82/14 A |
| 3,010,348 | 11/1961 | Swanson et al. | 82/14 D |
| 3,252,362 | 5/1966 | Forster et al. | 82/14 R |
| 3,279,288 | 10/1966 | Mannaioni | 82/14 A |
| 3,520,216 | 7/1970 | Jeanneret | 82/14 R |
| 3,554,064 | 1/1971 | Skillen | 82/14 C |
| 3,555,941 | 1/1971 | Cudnohufsky | 82/14 C |

Primary Examiner—Harrison L. Hinson

[57] ABSTRACT

An automatic program controlled profile lathe for turning cylindrical workpieces with rough and finished cuts is described. The lathe has a cross feed on which a post is slidably located. A tool is held on the post in opposition to the workpiece and hydraulic means are provided for reciprocally moving the post in the infeed direction toward the workpiece. The hydraulic means comprises a source of fluid, a valve for regulating the flow of fluid to determine the direction of movement of the post and a tracing lever articulatingly mounted on the post for actuating the valve in the infeed direction. The tracer lever is provided with first and second arms. A fixed template is located to engage the first arm for determining the operation of the valve for finish cutting. Stop means is arranged in the plane of the infeed movement of the second arm for engagement therewith to operate the valve and limit the movement of the post in the infeed direction during rough cutting. Means are provided for adjusting the stop to provide a plurality of selective positions for engagement with the post in the plane of movement of the second arm thereby permitting the post to move to effect different rough cuts.

20 Claims, 6 Drawing Figures

AUTOMATIC PROGRAMMED PROFILE LATHES

BACKGROUND OF THE INVENTION

The present invention relates to automatic program controlled profiling lathes for turning shafts such as bearing shafts, axles and the like, in particular to apparatus for limiting and defining the movement of the tool post to effect rough and finished cutting.

Lathes of the aforementioned type are provided with a tool holder, having tools capable of performing rough and finished cylindrical turning of the workpiece, which holder is mounted in a slidable post adapted to be moved reciprocally in a vertical plane at an angle to the workpiece. The post is mounted on a cross feed adapted to be moved reciprocally in a horizontal plane to the workpiece. The movement of the slidable tool post is effected hydraulically by the use of a pilot valve, controlled by a tracing lever articulatingly connected to the post. In order to effect rough cutting of the workpiece the tracing lever moves jointly with the post into engagement with one or more stops mounted at spaced intervals from the tracing lever. To carry out the actual finished contouring of the workpiece the tracing lever moves in engagement with a duplicating template which defines actuation of the post during rotation of the workpiece.

In the known lathes of this type the post is required to make several infeed and reversed movements toward a blank workpiece in order to make the necessary cylindrical rough cuts, while the workpiece is generally held stationary and before the workpiece can be turned in the finished form. In each case the infeed movement is limited by a separate stop. Generally these separate stops are arranged on an adjustable drum, which on completion of each rough cut and after the post has been moved back into its original starting position, is itself moved by a predetermined angle so as to present the stop determining the position of the post for the next rough cut. After all of the rough cuts have been performed the drum is finally moved automatically back to its original starting position.

The limitation of the in-feed movement of the tool post thus brought about, necessitates the readjustment of the drum stops when the lathe is reset for different workpiece. If such apparatus is used in automatic program controlled lathes, it is necessary to ascertain whether the stops, associated to each stage of the program, are in their initial standby position for the commencement of each rough cut. Moreover, the person operating the machine has to place the drum in the correct position before the actual programming operation can be placed into effect It is an object of the present invention to provide an automatic program controlled profiling lathe overcoming the disadvantages and defects of the prior art.

It is a further object of the present invention to provide a lathe of the type described with a hydraulically controlled apparatus by which the operation and setting up of the tool post for forming rough cuts is simplified.

It is another object of the present invention to provide a lathe of the type described in which the need for manual adjustment and supervision of the stops for limiting the movement of the tool post in rough cutting is eliminated and is replaced with automatically controlled adjustable means.

It is still a further object of the present invention to provide a lathe of the type described having adjustable stop means for controlling the operation of the tool post, capable of automatically effecting selected sequence different rough cuts.

The foregoing objects, other objects and numerous advantages of the present invention are set forth and will be apparent from the following disclosure of the present invention.

SUMMARY OF THE INVENTION

According to the present invention apparatus for controlling the operation of an automatic programmed profile lathe is provided to selectively effect rough and finish cutting of the workpiece held by the lathe. The lathe includes a cross feed on which is slidably located a tool post holding a tool in opposition to the workpiece. Hydraulic means are provided for reciprocally moving the post in an in-feed direction toward the workpiece and in an out-feed direction away from the workpiece. The hydraulic means comprises a pilot valve for regulating the flow of hydraulic fluid under pressure from a source thereof to means for reciprocating the post relative to the cross feed. A tracing lever is pivotally mounted on the post in association with the valve to actuate the same in the in-feed direction. The tracing lever has an arm extending therefrom in cooperation with a fixed template by which finished cutting of the workpiece is effected. The tracing lever is provided with another arm which is adapted to engage stop means pivoting the lever to deactivate the valve and limit the in-feed movement of the post. The stop means is arranged in the plane of movement of the second arm and is adjustable in that plane into a plurality of selected positions in direct response to the control program for the lathe to provide for a corresponding number of rough cuts.

In the apparatus according to the present invention, a single stop means is provided for limiting the in-feed path of the tool post in all of the rough cutting positions required. The selective positioning of the stop for each rough cut is carried out automatically in response to the control program, with a high degree of precision and simplicity. A servo controlled adjustment device responsive to the automatic program control of the lathe is provided for shifting the stop into its selected position.

While the stop can be designed in different constructions, an advantageous design resides in forming the stop with a smooth curve having its central axis parallel to that of the tracing lever so that the movement of the tracing lever jointly with the tool post acts to enable the arm of the tracing lever to engage cooperatively with the peripheral surface of the stop to pivot the tracing lever. It is further advantageous to arrange the stop member so that it is adjustable in the direction of movement of the arm of the tracing lever so that it can be shifted by means of the adjustment device, selectively, in opposite directions.

In the preferred embodiment the stop is formed with a planar surface which is arranged to be inclined with relation to the direction of movement of the post or of the arm of the tracing lever, which is attached to it and which pivotally rises on movement of the post in the in-feed direction. A particularly good design is obtained when the stop is formed by an elongated strip obliquely cut at one end to form the planar inclined surface and which is pivotable about an axis arranged at the opposite end parallel to the pivotal axis of the tracing lever. By appropriately pivoting the strip, with the adjustment device, the point of contact at which the arm of the tracing lever strikes the surface of the stop, can be shifted to correspond to the extent to which the tool post is to be moved in conformance with the control program.

Where the stop is adjustable linearly in the direction of the movement of the arm of the tracing lever or where as indicated above it is pivotable, the adjustment device can take the rather simple form of at least one hydraulically operated piston. When a pivotable strip is employed as the stop, the adjustment device may be provided with an adjustable stroke piston for each position in which the stop has to be positioned for a particular rough cut. In this instance the pistons are preferably arranged so as to be in a working position one behind the other along the longitudinal edge of the strip having the inclined surface. A compression spring is arranged to act against the opposite longitudinal edge of the strip against the action of the pistons. The spring further biases the strip against the action of the counter compression forces exerted by the arm of the tracing lever and maintains the strip stop in its original rest position. The hydraulic operation of the pistons is made responsive to a servo signal from the control program of the lathe. In this manner one or another of the pistons can be manipulated in any sequence so that any desired number of positions corresponding to the rough cuts, can be made without the necessity of rearranging or manually resetting the stop or the control program. One of the pistons of the adjustment device may be further used for pivotally moving the stop completely out of the way of the tracing lever after the completion of the last rough cut, in order to permit the tracing lever to freely act in conjunction with the profile template without interference from the stop means.

With the present invention it is also possible, without the use of any additional control means, to prevent the return of the tool post to its initial starting position, after completion of a rough or even finished cut, but instead to cause the tool post to move or index in the out-feed position by only a short intermediate step. This will permit the cutting of a secondary surface on the workpiece of a different diameter than the initial cutting surface, without the necessity of removing the tool from the workpiece such as lifting it from the inner periphery of the workpiece. The second section of cutting can be automatically controlled by the backward movement of the tool post in response to an adjustment only of the stop. This can be carried out since the stop can be initially fixed in a position corresponding to the first rough cut as a starting position intermediate the ends of its curved surface. Thus the second cutting operation will follow automatically by adjusting the stop into another position. The adjustment of the stop may be made in any sequence and can thus be used in outside copying in order to shorten the return time.

In a further advantageous embodiment of the invention, it is proposed to use as a pilot valve for the control of the movement of the tool post a slide valve construction whose slide or spool, actuated by the tracing lever, is itself located within a slidable valve sleeve movable in both directions within its own cylinder and which is adapted to carry out the finishing cut. The stroke of this valve sleeve is itself adjustable. By the use of such a double slide valve construction it is possible to utilize any one of the positions of the stop to provide two different distances in which the tool post can be moved. It is further possible by the use of the present apparatus to perform rough cuts behind a collar or radially outward extending flange formed on the workpiece. This can be obtained by adjusting the stop during the execution of a single rough cut, the adjustment device, should be preferably designed so that the adjustment can be carried out at varying speeds.

It must be further mentioned, for the sake of completeness, that the present invention can be used advantageously on lathes having a tool carriage comprising cross slides, i.e.: slides arranged in relationship to each other at 90° and adjustable by means of alternate controls so that any rectangular coordinate movement of the tool post can be obtained.

Full details of the present invention are set forth in the following description of its preferred embodiment and are shown in the accompanying drawings illustrating the same.

DESCRIPTION OF THE INVENTION

Figure 1:
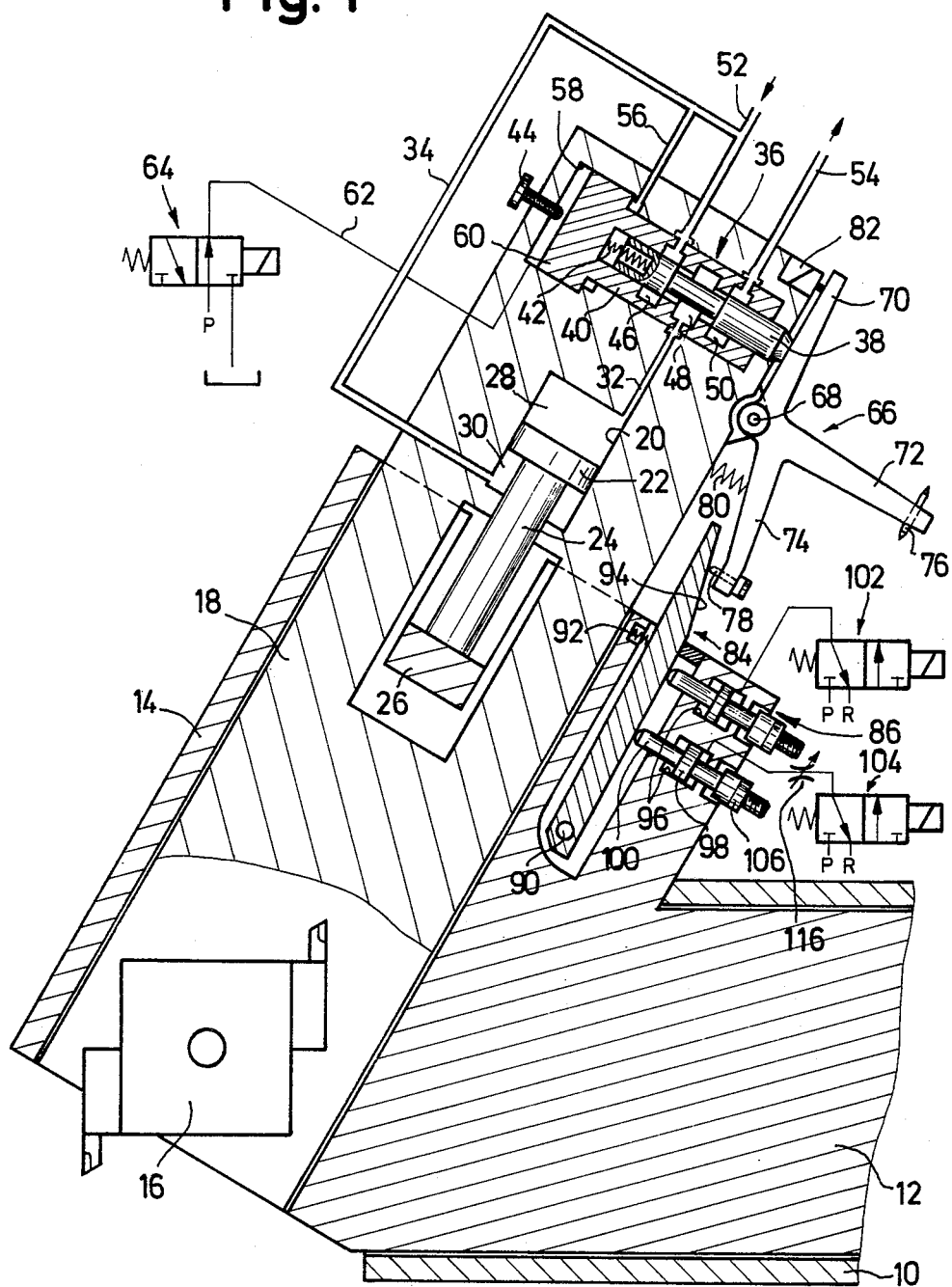
FIG. 1 is a longitudinal section through the tool post and cross feed showing the present invention.

In FIG. 1 only that portion of the tool holding section of a conventional lathe has been illustrated, which is required for a thorough understanding of the present invention. As seen in this figure a channel guide 10 locates a cross feed slide 12 which is reciprocally movable along its axis in a horizontal plane. The cross feed carries at its front end, preferably at an angle 60° to the horizontal, a channel guide 14 in which a tool post 18 is slidably mounted. A tool turret 16 is located at the lower end of the tool post 18 and is provided with one or more cutting tools. The tool post 18 is hydraulically actuated with respect to the channel guide 14 by forming within the upper end of the post a hydraulic cylinder 20 in which is located a piston 22. Extending axially from the piston 22 is a piston rod 24 which is fixed by a transverse piston support 26 directly to the channel guide 14 so that the piston is stationary with respect to the channel guide 14. The channel guide 14 and the post 18 are provided with cut-outs allowing the movement of the tool post 18 relative to the piston 22, 24, 26 and channel guide 14. The hydraulic cylinder 20 is divided by the piston 22 into two pressure chambers 28 and 30. A supply conduit 32 is formed through the tool post leading to the upper pressure chamber 28 which when pressurized forces the post 18 upwardly while a conduit 34 is formed in the tool post 18 leading to the lower pressure cylinder 30 which when pressurized forces the post 18 downwardly. Both ducts 32 and 34 lead to a double slide valve generally depicted by the numeral 36 located within a housing formed by a bore cut in the upper end of the tool post 18 along an axis perpendicular to the central axis of the tool post 18.

The double slide valve 36 acts as a pivot valve for the delivery of fluid under pressure to the pressure chambers 28 and 30 of the hydraulic cylinder 20 and is formed by a contoured slide or spool axially reciprocable within an axially adjustable valve bushing 40. While the term spool is used here for illustration any suitable slide, spool or rod actuated valve may be used. A compression spring biases the spool 38 in a normally outwardly extending position toward the right as seen in FIG. 1. The axial adjustment of the valve bushing 40 inside the outer housing is hydraulically biased. An adjustment screw 44 extends through the wall of the tool post 18 and is manually manipulatable to limit the stroke of the valve bushing 40. The interior of the valve bushing is provided with three pressure chambers 46, 48 and 50 respectively. A pressure supply conduit 50 is connected to the valve chamber 46 and leads from a source of hydraulic fluid under pressure. The supply duct 32 leading from the pressure chamber 28 of the hydraulic cylinder 20 leads to the chamber 48 while a return duct 54 leads from the valve chamber 50 to the source of fluid. The interconnection of these valve chambers 46, 48 and 50 is brought about or prevented by axial movement of the spool 38.

The pressure supply conduit 52 is connected and communicates with the duct 34 leading to the pressure cylinder 30 of the hydraulic cylinder 20. In addition a branch conduit 56 leads from the pressure supply duct 52 to a cylinder 58 formed between the slidable valve bushing 40 and its housing. The valve bushing 40 is provided with a piston head 16 which fits within the cylinder 58 and divides the cylinder into two portions. In the portion of the cylinder 58 on the opposite side of the piston head 60 to the conduit 56 is another conduit 62 which leads to a multiple servo valve 64 which valve is interposed in line with a source of hydraulic fluid. Operation of the servo valve 64 by any known means enables the provision of hydraulic fluid to be fed under pressure into the cylinder 58. By balancing the hydraulic fluid fed through conduits 56 and 62 on opposite sides of the piston head 60 adjustment of the valve bushing chamber axially within its housing can be made. Adjustment of the valve bushing, as will be explained later, is necessary for effecting the finish cut or profiling of the workpiece.

Figure 2:
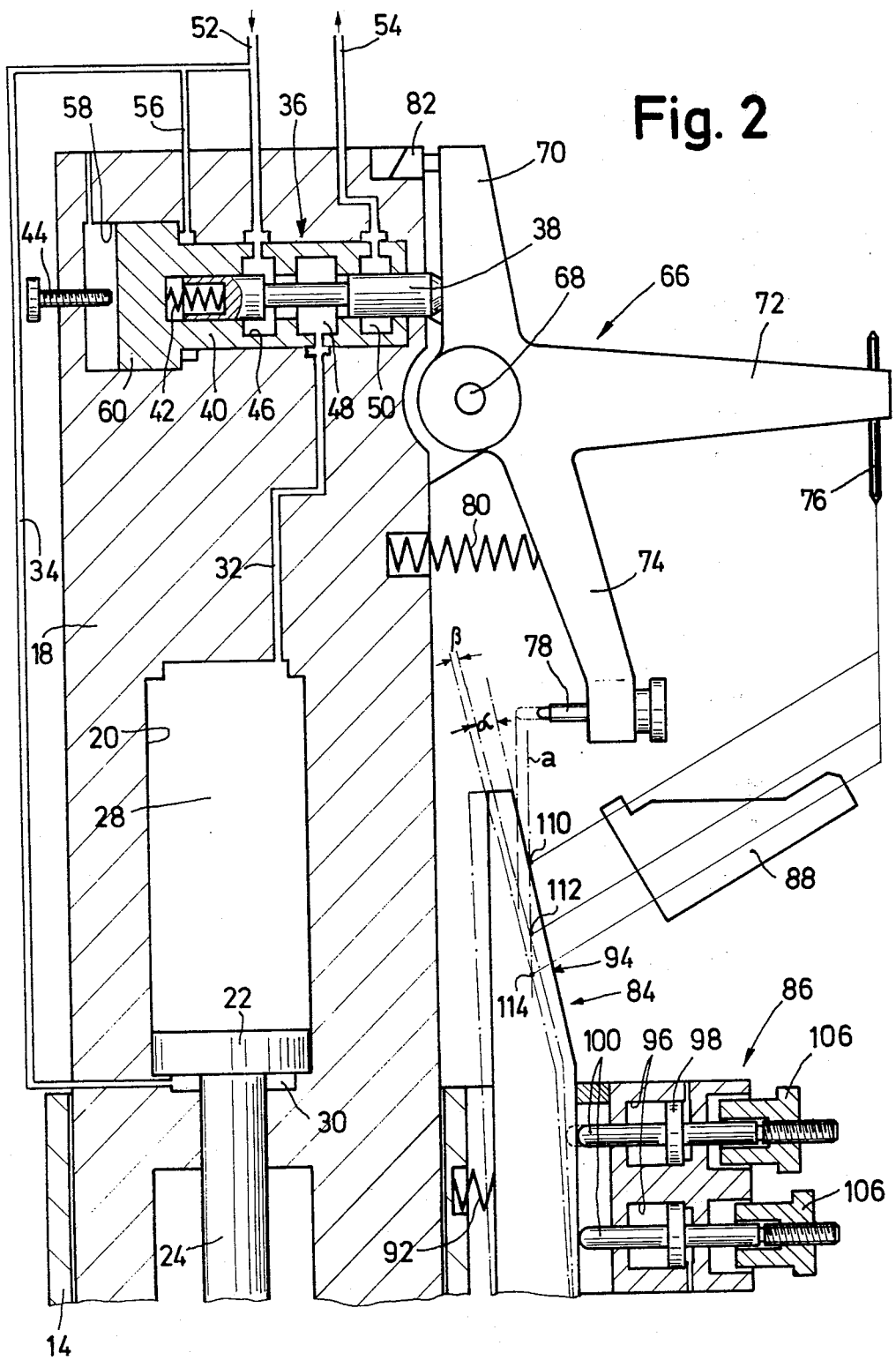
FIGS. 2 and 3 are views similar to that of FIG. 1 illustrating the method of operating the present invention and particularly the stop for adjusting the in-feed distance of the tool post.
Figure 3:
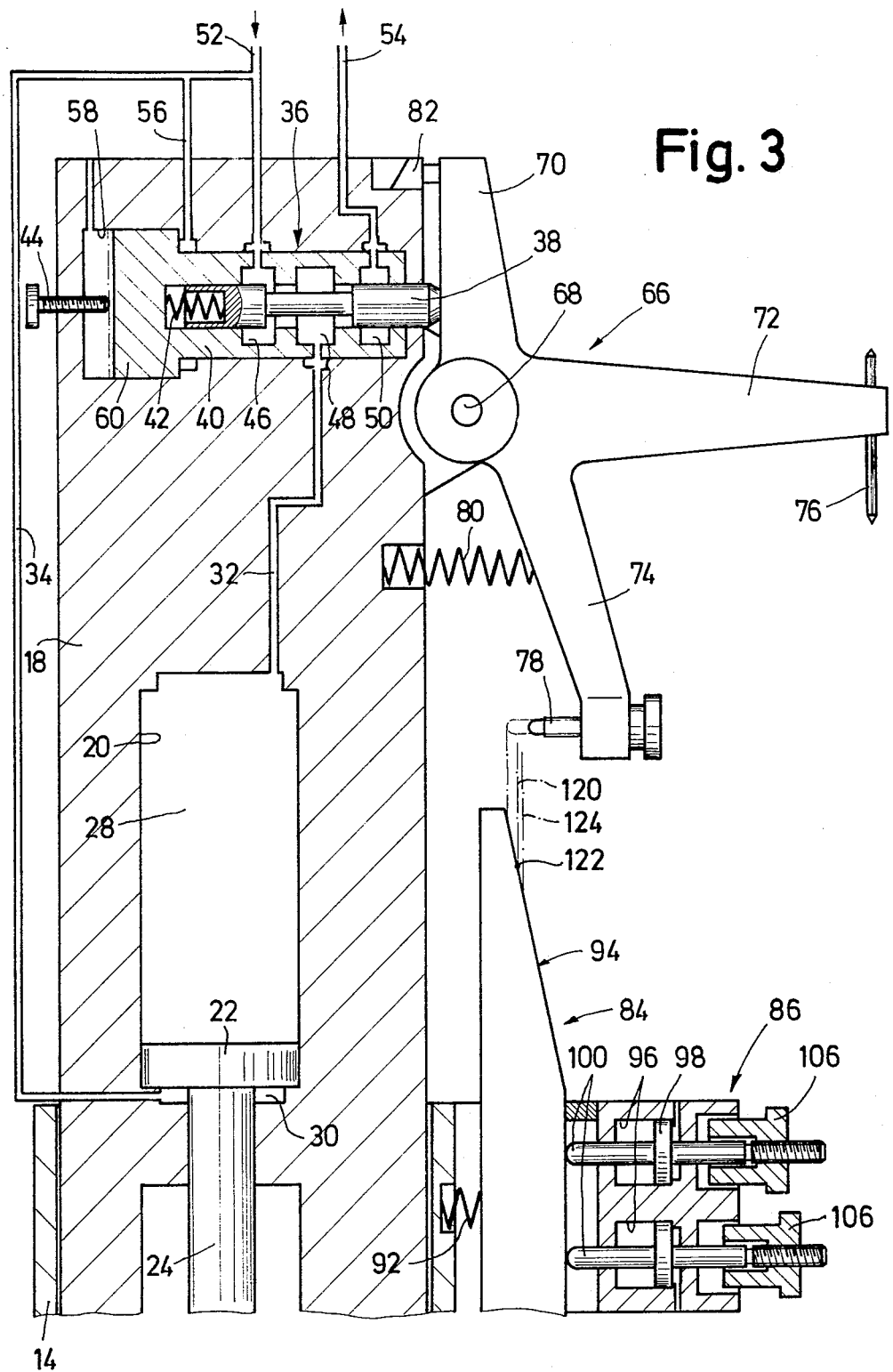

The operation of the pilot valve 36 in order to control the movement of the tool post 18 for carrying out its in-feed movement required for the execution of cylindrical rough cut and/or for performing the actual profiling finish cut is effected by means of a tracing lever generally depicted by the numeral 66. The tracing lever 66 is pivoted about an axis 68 which extends at right angles to the direction of movement, or the central axis of the tool post 18 and below the pilot valve 36. The tracing lever is provided with three arms 70, 72 and 74. The arm 70 extends upwardly generally along the longitudinal edge of the tool post 18 in line and adjacent to the spool 38 of the pilot valve 36. The arm 72 extends outwardly from the edge of the tool post 18 and is provided with a tracer pin 76 which is adapted to engage the surface of a suitable template. The arm 74 extends downwardly and is provided with a sensor pin 78. A compression spring 80 is arranged between the arm 74 and the edge of the tool post 18 so as to bias the arm 74 outwardly to normally pivot the tracing lever 66 in a counterclockwise direction, as seen in FIG. 1. In this normally rest position the arm 70 urges the spool 38 axially to the left so that as seen in FIGS. 2 and 3 the valve chamber 48 of the pilot valve 36 is in communication with the source of pressurized fluid through valve chamber 46 and conduit 52 thus supplying pressurized fluid via duct 34 into the pressure chamber 28 of the hydraulic cylinder 20. As a result the tool post 18 is normally forced in an upward or out-feed direction withdrawing the tools from possible engagement with the workpiece. In order to move the tool post 18 in the in-feed direction, or downwardly or as seen in the drawings, the tracing lever 66 has to be pivoted in a clockwise direction against the bias of the compression spring 80.

In order to pivot the tracing lever 66 in the clockwise direction a magnetic motor 82 such as a solenoid, is mounted at the upper end of the tool post 18 adjacent to the end of the lever 70. The magnet 82 comprises a normally unactivated coil and a movable core. On actuation of the coil by the suitable impression of an electric current therethrough, the coil forces the core outwardly, to the right as seen in the figures, thereby forcing the arm 70 to pivot the tracing lever 66 clockwise. The clockwise movement of the tracing lever 66 permits the spool 38 to be biased outwardly, also to the right, by the compression spring 42 thereby closing the connection between the valve chambers 46 and 48 and opening communication between the valve chamber 48 and the valve chamber 50. As a result free communication between duct 32 and the return conduit 54 is established. Simultaneously the hydraulic pressurized fluid supplied through conduit 52 passes through the duct 34 into the lower pressure chamber 30 forcing the tool post 18 downwardly in the in-feed direction. This movement takes place in rapid traverse as long as the arm 70 is held outwardly from the edge of the tool post 18 by the excited magnet 82. As a result the tool post 18 is forced hydraulically to present the tool 16 to the surface of the workpiece and thereby effect the cutting operation.

Limitation of the in-feed movement of the tool post 18 is obtained, in coordination with the tracing lever 66 by a stop generally depicted by the numeral 84 which is located generally along the plane of movement of the arm 74. As the tracing lever 66 is carried downwardly in the in-feed direction by the tool post 18 the end of the arm 74 engages the stop 84 and the stop 84 causes the arm 74 to move counterclockwise forcing its generally opposite arm 70 to pivot against the action of the magnet 82. This counterclockwise movement causes the arm 70 to push against the spool 38 of the pilot valve 36 returning the spool to its initial rest position. By suitably contouring the stop 84 the tracing lever 66 may be pivoted counterclockwise in a predetermined path so as to arrest the in-feed movement of the tool post after a predetermined path or distance has been traversed by it. The stop 84 is adjustable, in order to vary the position of engagement with the arm 74 of the tracing lever 66 by an adjustment device generally depicted by the numeral 86. In this manner the in-feed path or distance of movement of the tool post 18 can be varied in a rapid traversing manner. The adjustment device 86 is adapted to be controlled by suitable servo mechanisms directly from the control program of the automatic lathe so that the initial point of contact between the arm 74 and the stop 84 can be selectively varied and in this manner selective variation of the distance traversed by the tool post 18 can be obtained. By enabling the adjustment of the device in several positions, the tool post 18 may be rapidly traversed in several cylindrical rough cut positions before the finished turning or profiling of the workpiece can be effected by turning over the operation of the tool post 18 to the duplicating function associated with the tracer arm and tracer pin 72 and 76 respectively. At this point, the stop 84 is removed from a position effecting the movement of the arm 74 and the tracer pin 76 is positioned to move along a stationary contouring template 88 (FIG. 2).

In the embodiment shown in the drawings, the stop 84 is formed by a narrow oblong strip of material such as metal, plastic or similar hard material. The strip is pivoted at its lower end about an axis 90 arranged parallel to the pivoting axis 68 of the tracing lever 66. The stop is arranged within a suitable cut-out in the cross slide 12 and is provided with a compression spring 92 arranged between its rear face and the face of the guideway 14. The upper end of the oblong strip is obliquely cut to provide a planar inclined surface 94 arranged at an angle to the direction of movement of the tool post 18. The surface 94 has a cam-like contour rising in the direction of the in-feed movement and thus forms to some extent a cam wedge, on whose conical surface the tracing pin 78 is adapted to ride and in accordance with the incline of the surface 94 adapted to pivot the tracing lever 66 in a counterclockwise direction.

The adjustment device, generally depicted by the numeral 86, comprises at least a pair of hydraulic cylinders 96 in each of which is arranged a piston 98 to which is connected an extending piston rod 100 directed toward the front face of the strip forming the stop 84. Leading to each of the cylinders, behind the piston 98 is a conduit. The conduit communicates with a source of fluid under pressure and a suitable servo control mechanism by which the fluid under pressure may be delivered to the cylinder 96 urging the outward extension of the piston rod 100 into engagement with the stop 84 and pivoting the stop 84 about an axis 90 in a counterclockwise direction. In the absence of hydraulic fluid the pressure of the spring 92 forces withdrawal of the piston 94 within the cylinders 96 and the return of the cam 84 to its initial position. The servo mechanisms by which the pistons 98 are triggered may as seen in FIG. 1 comprise servo valves 102 and 104 which can be switched on electrically or electro-mechanically in response to a signal derived from the control program of the machine lathe. In a similar way the control of the pistons can also be made via a single multiple position valve. The stroke of the pistons 100 and therefore the pivoting angle of the strip and forming the stop 84 can be adjusted by providing the piston rod with a threaded ring mechanism to enable variation of the extension of the rod 100 from the piston 98.

Other constructions of the stop mechansim can be made. For example, the stop may be provided with a member having a smooth curved surface having a central axis lying parallel to the axis 68 of the tracing lever 66. Instead of pivotally mounting this stop, the stop may be mounted for linear movement toward and away from the arm 74 so as to thereby vary the initial position in which the sensing pin 78 engages the peripheral surface of the stop. The linear movement of the stop can also be obtained by securing the stop at the end of a piston, rack or other index mechanism which can also be activated in response to a signal from the programming control to thereby move the stop in the linear direction. Other forms will be obvious to those skilled in the present art.

The method of operation of the apparatus herein described is as follows:

On initiation of the profiling operation, the apparatus is set generally as indicated in FIGS. 2 and 3 wherein the tool post 18 is hydraulically forced upwardly by the action of the arm 70 of the tracing lever 66 moving the spool 38 to the left. The start of the actual profiling operation is made when the magnet 82 is excited extending its core so as to pivot the tracing lever 66 clockwise thereby permitting the pilot valve 36 to open and allow fluid under pressure through duct 34 into the lower pressure cylinder 30. This causes the tool post 18 to move downwardly in the in-feed direction carrying with it the tracing lever 66 until the tracer pin 78 at the end of arm 74 engages the inclined cam-like surface 94 of the stop 84. As the tool post 18 continues to descend, the surface 94 causes the tracing lever 66 to pivot counterclockwise, moving it against the normal bias of the magnet 82 until it overcomes the magnet 82 to the degree wherein the spool 38 closes the valve chamber 50. At this point the tool post 18 is arrested in its forward movement and is held there by balance of pressures in the hydraulic cylinder 20.

As may be seen from FIG. 2, the position of the tool post 18 after the first portion of its movement in forming the rough cut, is determined by the point of intersection 110 of the movement of the pin 78 in the vertical plane a with the inclined surface 94. When the tool post 18 has fully performed its in-feed movement, the cross feed 12 by which the tool is actually presented to the workpiece for performing the first cylindrical rough cut can then come into operation in the usual known manner. After completion of the desired rough cut, the magnet 82 is automatically de-energized via a control switch (not shown) so that the tracing lever 66 can be completely pivoted counterclockwise under action of the compression spring 80. The complete counterclockwise movement of the tracing lever 66 returns the spool 88 to the initial position wherein communication is had between the valve chambers 46 and 48 thereby permitting flow of pressurized fluid through the duct 82 into the upper pressure cylinder 28. This forces the tool post 18 upwardly and returning it to its original starting position.

Figure 5:
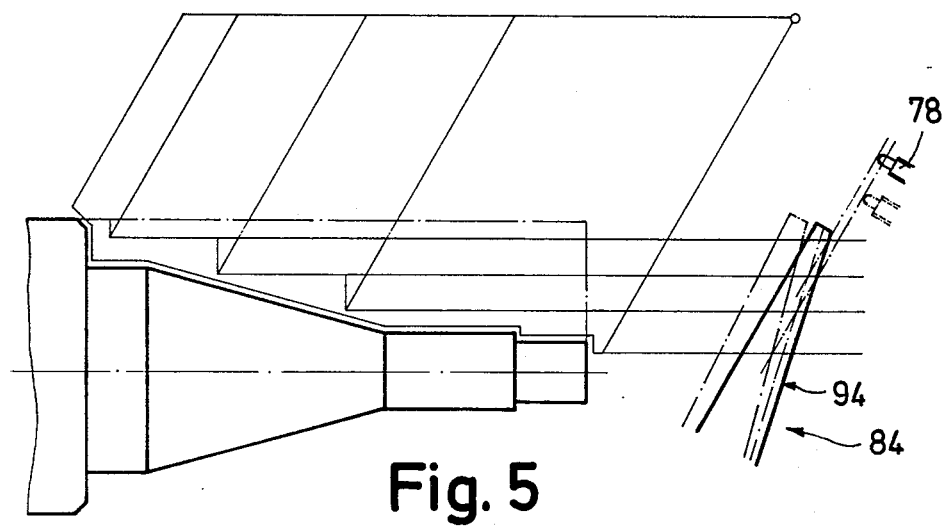
Figure 6:
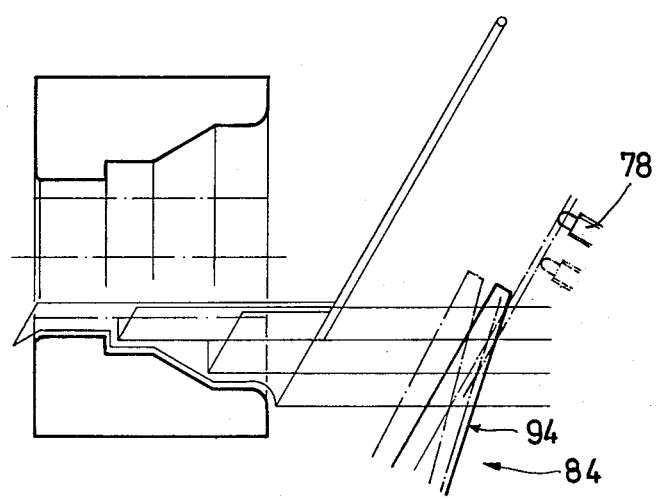

For the execution of the next cylindrical rough out, the tool post 18 must again be moved by the same sequence of events wherein the magnet 82 is excited, etc. For subsequent cylindrical rought cut, however, the distance of in-feed movement must be varied. This is done by actuation of the adjustment device 86, that is actually by activation of one of its pistons 100 outwardly toward the left. As a result the stop 84 is pivoted by a predetermined angle alpha $\alpha$ (see FIG. 2) so that the point of intersection is now at point 112. In the embodiment shown two pistons are provided permitting two adjustments from the initial position to be made. By arranging the pistons one below each other and/or by selectively determining the length of the piston rods 100, the angle at which the stop 84 can be pivoted can be selected. The first adjustment may be effected for instance, by the use of the upper piston while the second by use of the lower piston as shown in the dot-dash lines of FIG. 2 or vice versa. After actuation of the upper piston 100 moving stop 84 through the angular displacement alpha, the magnet 82 can then be actuated causing the tool post 18 to perform a second in-feed movement, which is interrupted only when the tracer pin 78 has reached the inclined cam surface 94 of the stop 84 at the intersection 112. When the second rough cut has been completed, the tool post 18 may be returned to its upward position in the manner previously described. The stop 84 may be thereafter adjusted by the angle β to permit a third rough cut. The second adjustment may, if desired, place the stop 84 out of position allowing the template tracer arm 72 to contact template 88, thereby permitting the actual finish profiling cut. By pivoting the stop 84 even further by the use of the lower piston, the tool post 18 descends downwardly in the in-feed direction until the path of movement of the pin 78 would normally intersect with the surface 94 of the stop 84 at the point 114. As noted in FIG. 2 the intersection point 114 lies below the surface of the profile edge of the template 88 suitably mounted on the lathe frame. In this condition the template pin 76 lies at or below the surface of the template 88. When this position has been reached, the lathe may be prepared for performing the finished cutting. If desired the adjustment device 86 can be further used to pivot the stop 84 completely out of the way of the tracer arm 74. Thereafter the cross feed 12 is actuated to perform its horizontal movement toward the workpiece carrying the tool post 18 with it. The tracer pin 76 moves along the surface of the contouring template 88 and the workpiece is actually given its final form, as seen in FIG. 5. It is of course obvious that the use of additional piston and cylinders in the adjustment device 86 will make it possible to determine a very much larger number of rough cut positions for the tool post 18 than the use of the two piston and cylinders shown so that any selected combination of rough cuts can be made before the finished cutting is done.

Figure 4:
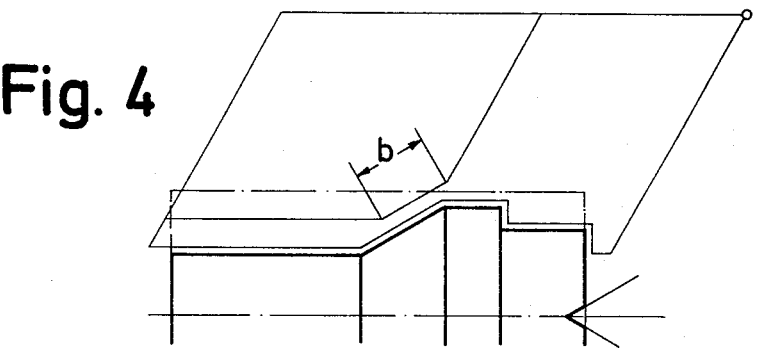
FIGS. 4, 5 and 6 are diagrams representing the working course of rough cuts and finishing profile cuts made with the apparatus of the present invention.

By fixing the positions of rough cutting of the tool post 18 by appropriately pivoting or linearly shifting the uninterrupted, planar cam surface 94 of the stop 84 it is possible to alter the in-feed distance traversed by the tool post 18 even when the tool post 18 has already moved forward and is in an initial rough cutting position. Thereby additional advantages not found in the prior art devices can be obtained. In particular it is possible to make the tool post 18 perform two superimposed movements so that for instance rought cutting can be carried out behind a collar or flange stop. It is only necessary to modify the adjustment device 86 by inserting within the conduit that leads to the respective cylinder 96, performing the necessary adjustment of the stop 84, a fluid regulating or throttling valve 116, as seen in FIG. 1. By the use of the throttling valve or a similar quantity or flow regulating valve, the stop 84 may be shifted at a slow speed so that a simultaneous longitudinal movement of the tool post 18 can be made. Thus by allowing the tool post 18 to follow according to the rate of adjustment of the stop 84, the tool post 18 may be moved in the direction of the workpiece along an inwardly tapering direction as seen by the path b shown in FIG. 4. Since the initial point of intersection of engagement of the sensor pin 78 with the cam surface 94 is made intermediate the end positions of the surface 94 the adjustment of the position of the stop 84 can be made in either direction and thereby tapers of smaller or larger conical extent can be made.

Due to the fact that the pilot valve 36 is formed with an axially adjustable valve bushing 40 arranged in the housing, it is possible to finish the profile cut where the depth of the finishing cut is determined by the shift of the valve bushing. This arrangement also makes it practicable to carry out two rough cuts for every position of the stop 84. This doubles the number of rough cuts without the necessity of adding extra complexity to the adjusting device 86. It will be obvious from FIG. 1 that varying the relative pressures between conduits 62 and 56, the bushing 40 will shift axially thereby changing the relative position of the spool 38 of the pilot valve 36 with respect to the arm 70 of the tracer lever 66.

It has been found particularly desirable to form the planar cammed or curved surface of the stop 84 with an inclination relative to the direction of movement of the tracing lever 66 in the ratio of between 1:5 or 1:10. The first rough cut is also determined, in this preferred situation by the original position of the stop 84, shown in FIGS. 1 and 3. The valve bushing 40 of the pilot valve 36 is at the same time moved to the right by applying pressure to the left side of the piston head 60, as seen in FIGS. 2 and 3. In this arrangement, the pilot valve spool 38 blocks communication of the valve chamber 46 with the upper pressure chamber 28 of the hydraulic cylinder 20 immediately as soon as the tracer pin 78 is in the plane noted by the dash-dot line 120 of FIG. 3. The first cylindrical rough cut is therefore determined by the point of intersection 122 of the line 120 with the surface 94 of the stop 84 after the forward in-feed movement of the tool post has been initiated by the excitation of the magnet 82. To execute the second rough cut without modifying the position of the stop 84, the valve bushing 40 is shifted to the left until the piston head abuts against the manually adjustable set screw 44, by supplying hydraulic fluid via the branch conduit 56 with simultaneous relief of pressure in the conduit 62. Thereby altering the position at which the spool 38 will shut off flow of fluid under pressure.

The altered position of the sensing pin 78 with respect to the surface 94 of the stop 84 is indicated by the dot-dash line 124 in FIG. 3. It corresponds to the thickness of the finishing cut when the sensing arm 74 and the tracing arm 72 are of the same length. Through the axial adjustment of the valve bushing 40, with the unchanged position of the stop 84, a second rough cut position is obtained, which in accordance with the curvature or inclination of the smooth cam surface 94 of the stop 84 is a multiple of the thickness of the finishing cut. If for instance the surface 94 has an inclination ratio of 1:5 and the finishing cut depth obtainable by adjustment of the valve bushing 40 is a size approximately 0.5 mm, there is produced, thereby, an in-feed path for the tool post 18 an additional depth of rough cutting of 0.5:1/5 plus 2.5 mm.

The present design moreover permits inside contouring, without having to make special arrangements for the return of the tool post 18 from the workpiece. This is possible, as noted earlier by providing the point of intersection between the sensing pin 78 and the surface 94 of the stop strip at an intermediate position between the ends of the surface 94 and not at either the one or the other of the ends. Therefore, after the completion of each rough cut, the stop 84 can be released and readjusted by the adjustment device so that it can be pivoted back, by the compression spring 92 into a new starting position. In the course of this pivoting movement, through the corresponding deflection of the tracing lever 66, the tool post 18 may be raised slightly from its previously extreme inward in-feed position thereby lifting the tool from one surface of the workpiece to another surface of the workpiece and thereby providing the inside contouring.

It has been seen from the foregoing that the present invention provides a very simple, effective and precise hydraulic adjustment of the movement of the tool post of a profiling lathe. The apparatus described in accordance with the present invention provides and meets all of the objects and advantages enumerated earlier as well as those set forth within the description. Various changes, modifications and embodiments have been suggested in the disclosure. Other such changes, modifications and embodiments will be obvious to those skilled in the present art. It is accordingly intended therefore that the present disclosure be taken as illustrative only and not as limiting of the present invention whatsover.

What is claimed is:

1. Apparatus for controlling the operation of an automatic program profile lathe to selectively effect rough cutting of the workpiece held thereon comprising a cross feed, a post slidably located on said cross feed, a tool held on said post, hydraulic means for reciprocally moving said post in the in-feed direction toward said workpiece and in the out-feed direction away from said workpiece comprising a source of fluid under pressure, a pilot valve for regulating the flow of fluid to determine the direction of movement of said post, a lever pivotally mounted on said post for actuating said pilot valve, said lever having an arm extending therefrom, stop means pivotally arranged in the plane of movement of said arm, said stop means having a cam surface for engaging said arm on movement of said tool post in the in-feed direction, said arm being operable in response to the contour of said cam surface to operate said valve to limit the flow of fluid to said hydraulic means at a predetermined position for arresting the movement of said post in the in-feed direction and means for adjusting the position of said stop in the plane of movement of said arm to provide a plurality of selective positions for arresting the movement of said post at different distances of in-feed.

2. The apparatus according to claim 1 wherein said cross feed is movable in a horizontal direction toward said workpiece, and said lever includes a second arm extending therefrom and said apparatus includes a fixed template located to be engaged by said second arm on the movement of said tool post to the limit of its in-feed to thereby cause said lever to determine the operation of said pilot valve for finish cutting.

3. The apparatus according to claim 1 wherein the stop is mounted about an axis parallel to the axis of said pivotable lever.

4. The apparatus according to claim 3 wherein said means for adjusting said stop is adapted to move said stop in opposite directions in the plane of movement of said pivotable lever.

5. The apparatus according to claim 1 wherein the stop is pivoted about an axis to be moved arcuately with respect to the plane of movement of said pivoting lever and said means for adjustment is adapted to angularly shift said stop.

6. The apparatus according to claim 3 wherein said stop has a planar cam surface arranged at an inclination to the direction of movement of the tool post and rising in the in-feed direction.

7. The apparatus according to claim 6 wherein the stop is formed of a piece of a strip of material and said cam surface is formed by obliquely cutting the longitudinal edge thereof at one end and wherein said strip is pivotable about an axis arranged at the opposite end of said strip parallel to the axis of said pivotable lever.

8. The apparatus according to claim 1 wherein the adjustment means comprises at least one cylinder and piston actuated by a pressure medium.

9. The apparatus according to claim 8 wherein said adjustment means comprises a plurality of pistons, each of which is adaptable to arrange said stop in a given predetermined position.

10. The apparatus according to claim 9 wherein said plural pistons are arranged below one another on one side of said stop and spring means are arranged on the opposite side of said stop to bias said stop normally into engagement with said pistons.

11. The apparatus according to claim 10 wherein means are provided for adjusting the stroke of said pistons.

12. The apparatus according to claim 10 wherein said pistons are provided with servo control means responsive to the program control of said lathe for adjusting the movement of said pistons in any sequence and at different speeds.

13. Apparatus according to claim 3 wherein the first arm of said pivotable lever carries an adjustable sensing member adapted to engage said stop.

14. The apparatus according to claim 1 including means for initially moving said pivotable lever in opposition to the direction of movement created by said arm.

15. The apparatus according to claim 1 wherein said means for initially moving said lever comprises a magnet.

16. The apparatus according to claim 1 wherein said pilot valve comprises a double slide valve having a slide slidably mounted within a valve bushing which is axially adjustable in a surrounding housing.

17. The apparatus according to claim 16 including means for varying the stroke of said valve bushing.

18. The apparatus according to claim 1 wherein said cam surface is curved.

19. The apparatus according to claim 1 including means for normally biasing said stop in a given pivotal direction.

20. The apparatus according to claim 8 including means for varying the speed of the stroke of said piston.

* * * * *